J. DAVIS.
FAUCET OR COCK.
APPLICATION FILED AUG. 9, 1909.
967,886.
Patented Aug. 23, 1910.
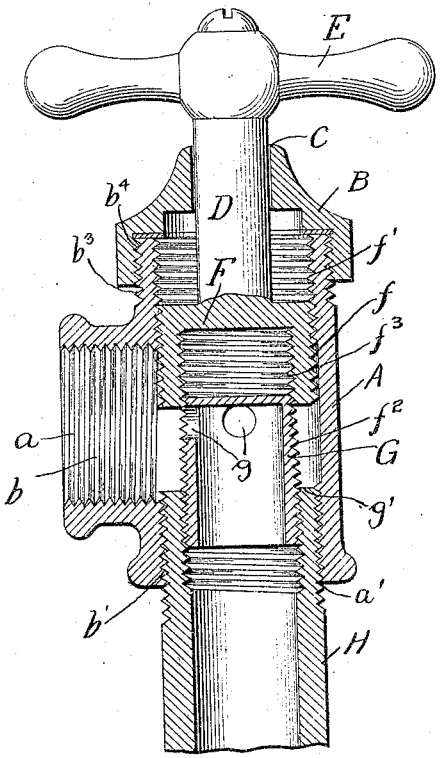
Witnesses
C. F. Reichenbach
W. H. Rockwell
Inventor
John Davis
Wm. H. Bates
Attorney

UNITED STATES PATENT OFFICE.

JOHN DAVIS, OF WASHINGTON, DISTRICT OF COLUMBIA.

FAUCET OR COCK.

967,886.  Specification of Letters Patent.  Patented Aug. 23, 1910.

Application filed August 9, 1909. Serial No. 511,930.

*To all whom it may concern:*

Be it known that I, JOHN DAVIS, citizen of the United States, residing at Washington, in the District of Columbia, have invented certain new and useful Improvements in Faucets or Cocks, of which the following is a specification.

My invention has relation to improvements in faucets or cocks of that class known as two way cocks, and it has for its object to simplify and improve the construction of this type or character of cocks over the existing prior state of the art.

With these and other objects in view the invention consists in the novel construction and combination of parts as will be hereinafter more in detail described, and the asserted novelty specifically claimed.

I have illustrated my invention in the accompanying drawing in which the figure represents my device with the various parts assembled therein and ready for use.

Similar letters of reference indicate corresponding parts in the figure.

Referring to the drawing: A designates the valve casing which is provided with the usual ports $a$, $a'$ leading therefrom, said ports being screw-threaded with female threads upon their inner surfaces as at $b$, $b'$. The upper portion of the casing A is also screw-threaded upon its outer surface a portion of its way with male screw-threads $b^3$.

B designates a cap provided with an opening C for a purpose which will hereinafter be explained. This cap is provided upon its inner surface with female threads $b^4$ which the corresponding male threads $b^3$ formed upon the upper portion of the casing aforesaid engage.

D designates a valve stem which is guided through the opening in the cap C to the upper end of which is secured the usual handle E.

F designates a valve which is formed integrally with and terminates in the lower part of the stem. This valve is provided upon its outer surface with male screw-threads $f$ within which corresponding female threads $f'$ of the casing engage. The inner surface of said valve is also provided with female threads $f^3$ to engage male theads $f^2$ formed upon the outer surface of a nipple G having its upper end imperforate, and at the imperforate end of this nipple and around the periphery of the same are provided one or more openings $g$. When used as a faucet if desired the nipple G may be dispensed with.

H designates a tubular section, the upper portion of which is provided with male and female screw-threads, the former upon its outer surface and the latter upon its inner, the outer threads of said section engaging female threads upon the inner and lower end of the casing, and the inner threads engaging the outer and corresponding threads upon the lower and open end of the nipple which end telescopes within the upper end of the tubular section H. If preferred the nipple G and the tubular section H within which it telescopes may be formed integrally, a valve seat $g'$ being formed at the upper end of the tubular section H upon which the lower end of the valve is seated when closed, and which forms an exceedingly close or ground joint which effectually prevents any leakage of water through the threaded parts when operated by the handle E to regulate the flow or quantity of water, steam or gas through the openings in the nipple G. When steam is used suitable packing may be employed.

My device when suitably connected with the water supply pipes of a house or other structures to which it is adapted the advantages thereof will be readily seen over the ordinary forms of construction of cocks. Connection is made through the medium of the section of tubing to supply pipe.

From the foregoing description taken in connection with the accompanying drawing the operation of my device will be obvious, and further description herein is thought to be deemed unnecessary.

Having thus described my invention what I claim as new and desire to secure by Letters Patent is:—

In a cock of the character described, the combination of a casing, a cap therefor, a valve stem, a valve head carried by the stem, said head having screw threads on its outer and inner surfaces, the outer threads adapted to engage the casing, a nipple having a closed top, and openings below said top, and having screw threads to engage the inner screw-threads of the valve head, the nipple and casing being threaded to engage a conduit.

In testimony whereof I affix my signature, in presence of two witnesses.

JOHN DAVIS.

Witnesses:
 JAMES F. NEALE,
 MARION B. WITHALL.